(12) United States Patent
Sion et al.

(10) Patent No.: US 11,988,768 B2
(45) Date of Patent: May 21, 2024

(54) RADAR SYSTEM

(71) Applicant: NXP USA, INC., Austin, TX (US)

(72) Inventors: Arnaud Sion, Munich (DE); Gustavo Adolfo Guarin Aristizabal, Munich (DE); Saif Alhasson, Munich (DE)

(73) Assignee: NXP USA, Inc., Austin, TX (US)

( * ) Notice: Subject to any disclaimer, the term of this patent is extended or adjusted under 35 U.S.C. 154(b) by 340 days.

(21) Appl. No.: 17/347,878

(22) Filed: Jun. 15, 2021

(65) Prior Publication Data

US 2021/0405151 A1 Dec. 30, 2021

(30) Foreign Application Priority Data

Jun. 25, 2020 (EP) .................................. 20182372

(51) Int. Cl.
*G01S 7/35* (2006.01)
(52) U.S. Cl.
CPC ...................................... *G01S 7/35* (2013.01)
(58) Field of Classification Search
CPC ............. G01S 7/35; G01S 7/354; G01S 13/50
See application file for complete search history.

(56) References Cited

U.S. PATENT DOCUMENTS

| 2005/0058218 A1 | 3/2005 | Jenkins |
| 2018/0267140 A1 | 9/2018 | Corcos et al. |
| 2018/0334124 A1* | 11/2018 | Kinsler .................. B60R 13/00 |
| 2019/0056478 A1* | 2/2019 | Millar ...................... H04B 1/69 |
| 2020/0049812 A1* | 2/2020 | Jansen ................ G01S 13/4454 |
| 2020/0209380 A1* | 7/2020 | Takayama ............... G01S 7/352 |
| 2020/0249344 A1* | 8/2020 | Heo ......................... G01S 13/04 |
| 2021/0072350 A1* | 3/2021 | Loesch ..................... G01S 7/42 |

OTHER PUBLICATIONS

Martin H. Weik, Communications Standard Dictionary, 1996, Chapman & Hall, 3rd edition, p. 283 (Year: 1996).*
Jansen, F.G., "Automotive Radar Doppler Division MIMO With Velocity Ambiguity Resolving Capabilities", Proceedings of the 16th European Radar Conference, Oct. 2-4, 2019.
Yang, F., "DDMA MIMO Radar System for Low, Slow, and Small Target Detection", IET International Radar Conference, The Journal of Engineering, vol. 2019, No. 19, pp. 5932-5935, Oct. 1, 2019.

* cited by examiner

*Primary Examiner* — James R Hulka
*Assistant Examiner* — Noah Yi Min Zhu

(57) ABSTRACT

The disclosure relates to a doppler division multiplexing (DDM) multiple input multiple output (MIMO) radar system. Example embodiments include a DDM MIMO radar system (400) comprising: a transmitter (401) connected to a plurality of transmitter antennas ($402_{1-N}$) via a corresponding plurality of signal paths ($403_{1-N}$) of different electrical lengths ($L_{1-N}$) such that a phase of a signal transmitted by the transmitter (401) is different at each of the plurality of transmitter antennas ($402_{1-N}$).

10 Claims, 4 Drawing Sheets

RADAR SYSTEM

FIELD

The disclosure relates to a doppler division multiplexing multiple input multiple output radar system.

BACKGROUND

Modern automotive radar systems require a high angular resolution. This may be achieved in two different ways. A first is to use a phased antenna array and to perform beamforming, in which multiple transmitters are combined with different phases to steer a beam. A second is to implement multiple input multiple output (MIMO) radar to create virtual antennas. For both strategies, however, a system with multiple transmitters and receivers is required. This results in the area, power consumption and power dissipation required to implement such systems at monolithic level eventually becoming prohibitive as the number of required channels grows in order to achieve higher angular resolution.

For MIMO radar systems, there is a requirement to use orthogonal signals for each transmitter channel to be able to reconstruct the information at the receiver. One way of achieving orthogonality between channels in automotive radar is by using doppler domain multiplexing (DDM) techniques. In DDM, frequency modulated signals are used and a frequency delta created between transmitter channels. Each channel can be identified at the receiver because it will fall in a different band frequency in the doppler spectrum. One way to generate the delta frequencies between channels is by changing phase from chirp to chirp with a defined sequence. A phase rotator at the transmitter is required to achieve this.

A problem with existing DDM MIMO radar is that multiple transmitter channels are required, which occupy increased area and increase the cost and power consumption of the system. A further problem is that accurate control of phase shifts between the transmitted channels is difficult using digital techniques.

SUMMARY

According to a first aspect there is provided a doppler division multiplexing, DDM, multiple input multiple output (MIMO) radar system comprising a transmitter connected to a plurality of transmitter antennas via a corresponding plurality of signal paths of different electrical lengths such that a phase of a signal transmitted by the transmitter is different at each of the plurality of transmitter antennas.

The transmitter may be configured to generate a series of M chirps in a radar cycle frame provided to each of the plurality of N transmitter antennas. Each of the N signal paths may have an electrical length $L_n$ such that a phase difference between an $m^{th}$ chirp in the radar cycle frame at an $n^{th}$ antenna and the $m^{th}$ chirp at a first antenna is equal to $(m-1)(n-1)*360/N$.

An electrical length $L_1$ of a first one of the N signal paths may be equal to $A_{m1}\lambda_m$ where $A_{m1}$ is an integer and $\lambda_m$ is a wavelength of a centre frequency of an $m^{th}$ chirp in the radar cycle frame.

A difference in electrical length between an $n^{th}$ signal path and the first one of the N signal paths may be equal to $X_n\lambda_m+(m-1)(n-1)\lambda_n/N$, where $X_n$ is an integer corresponding to the antenna number.

Where each chirp in the series of M chirps has a center frequency, the center frequency may change by a frequency difference $\Delta F$ between successive chirps.

According to a second aspect there is provided a method of designing a DDM MIMO radar system having N antennas connected to a transmitter via N signal paths having electrical lengths $L_{1-N}$, the method comprising:

defining a series of M frequencies separated by a frequency difference $\Delta F$ and having wavelengths $\lambda_{1-M}$;

determining an electrical length $L_1$ of a first one of the N signal paths;

determining a difference in length between the first one of the N signal paths and an $n^{th}$ signal path as $X_n\lambda_m+(m-1)(n-1)\lambda_m/N$, where $X_n$ is an integer.

In some examples the electrical length of the first one of the N signal paths may be determined as $\Delta_{m1}\lambda_m$, where $A_{m1}$ is an integer and $\lambda_m$ is a wavelength of an $m^{th}$ one of the series of M frequencies. In such examples the phase difference at the first antenna will be zero. In other examples the electrical length of the first signal path may be determined to be an arbitrary electrical length and the difference between this and the other electrical lengths determined. The phase at the first antenna can then be selected to be zero by rotating the phase of the output of the transmitter during operation.

According to a third aspect there is provided a method of operating a doppler division multiplexing, DDM, multiple input multiple output (MIMO) radar system comprising a transmitter connected to a plurality of N transmitter antennas via a corresponding plurality of signal paths of different electrical lengths, the method comprising the transmitter generating a series of M chirps in a radar cycle frame provided to each of the plurality of N antennas.

Each of the N signal paths may have an electrical length $L_n$ such that a phase difference between an $m^{th}$ chirp in the radar cycle frame at an $n^{th}$ antenna and the $m^{th}$ chirp at a first antenna is equal to $(m-1)(n-1)*360/N$. Other features relating to the first aspect may also apply to the method of the second aspect.

According to the first aspect, one transmitter is connected to multiple antennas with a different electrical length of the feeding structure and a central frequency of the chirp is changed from chirp to chirp. With this combination, a phase difference between chirps and between antennas will be generated which at the same time will generate the required effect to code every transmit channel in a different doppler band. In this way, only one TX channel is required to create a MIMO system. Energy, power dissipation and chip area can thereby be reduced. An additional advantage is that the phase shift for each transmitter can be designed precisely in contrast to the phase shifter in conventional RF chips which are controlled digitally and tend to have large error values (typically ±6°) which deteriorates the performance of the radar system. By using the waveguides instead with differing electrical lengths, the phase shift (and hence the frequency offset for each transmitter) can be set precisely and hence have a better performance and closer to the simulated model of a Doppler division multiplexing algorithm.

These and other aspects of the invention will be apparent from, and elucidated with reference to, the embodiments described hereinafter.

BRIEF DESCRIPTION OF DRAWINGS

Embodiments will be described, by way of example only, with reference to the drawings, in which.

Figure 1:
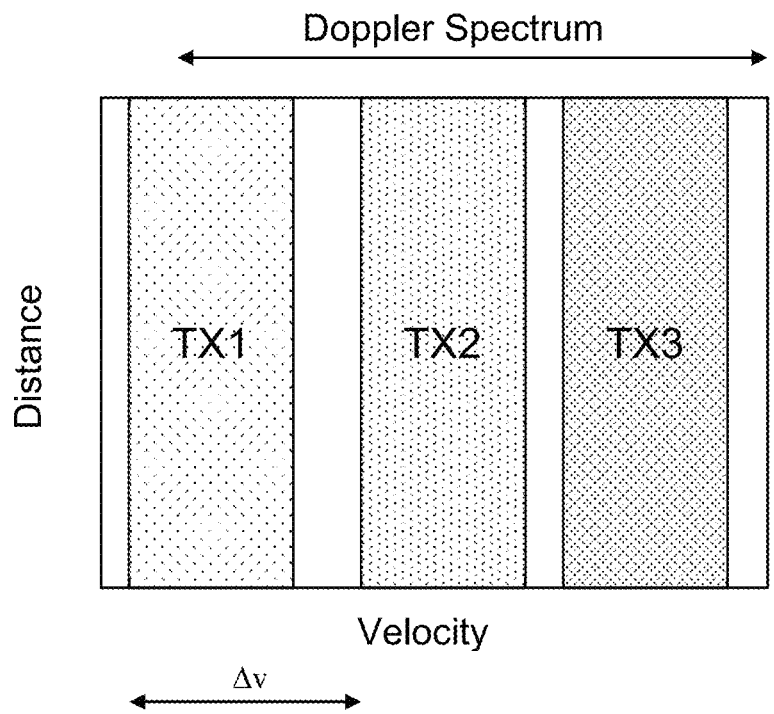
FIG. 1 is a schematic diagram of doppler domain multiplexing for three channels.

It should be noted that the Figures are diagrammatic and not drawn to scale. Relative dimensions and proportions of parts of these Figures have been shown exaggerated or reduced in size, for the sake of clarity and convenience in the drawings. The same reference signs are generally used to refer to corresponding or similar feature in modified and different embodiments.

DETAILED DESCRIPTION OF EMBODIMENTS

In doppler domain multiplexing, a frequency difference (or $\Delta f$) is provided between multiple channels. The $\Delta f$ needs to be large enough to be able to locate each channel in a different bandwidth. An example doppler spectrum is illustrated schematically in FIG. 1, in which three transmission channels TX1, TX2, TX3 are separated by differences in velocity Av across the spectrum.

To achieve doppler separation between channels, one way is to change the phase of each channel between chirps in a defined sequence. To achieve a channel separation equal to the doppler separation $\Delta f_{doppler}$, the phase shift may be expressed as:

$$\text{phase shift} = (M-1)(N-1)\Delta f_{doppler} PRI * 360° = \frac{(M-1)(N-1) * 360°}{N}$$

where PRI is the pulse repetition interval, m is the chirp number (from 1 to M) and n the channel number (from 1 to N).

Considering one transmitter driving three antennas, orthogonal code for successive chirps for each transmission channel is shown in Table 1 below. Channel TX1 retains a zero phase modulation, while channels TX2 and TX3 alternate between 120° and 240°.

TABLE 1

Orthogonal code for successive chirps for phase modulation of three transmission channels.

| | Phase modulation | | | | |
|---|---|---|---|---|---|
| | Chirp 1 | Chirp 2 | Chirp 3 | Chirp 4 | Chirp 5 |
| TX 1 | 0 | 0 | 0 | 0 | 0 |
| TX 2 | 0 | 120 | 240 | 0 | 120 |
| TX 3 | 0 | 240 | 120 | 0 | 240 |

Figure 2:
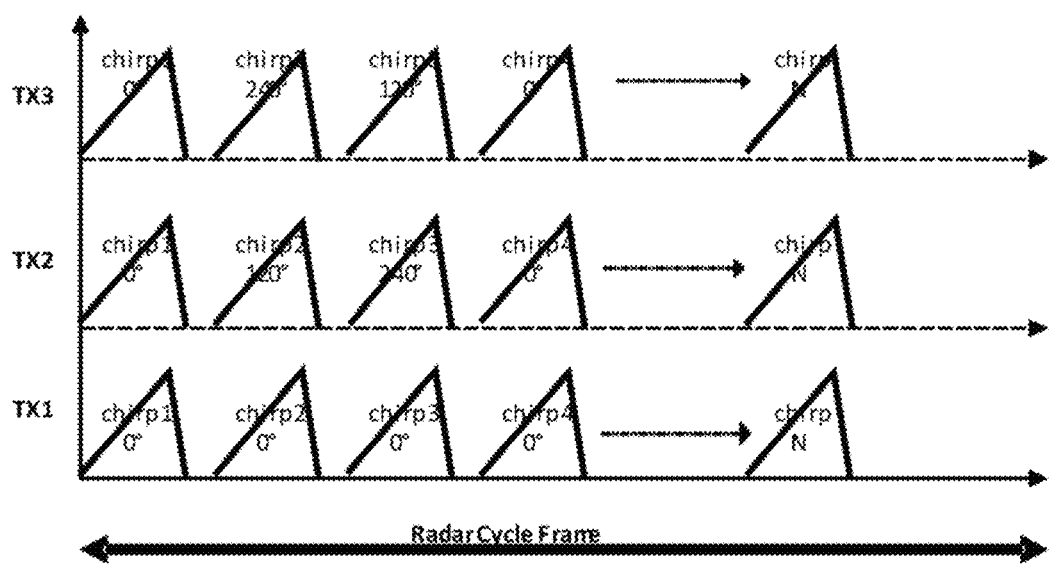
FIG. 2 is a schematic diagram of a series of chirps from transmitters in a radar cycle frame.

FIG. 2 illustrates an example sequence of chirps over a radar cycle frame, with N successive chirps chirp$_{1-N}$ being transmitted in each transmission channel TX1, TX2, TX3 over the radar cycle frame. For each chirp a frequency shift $\Delta f_n$ is introduced, where n ranges from 1 to N.

Figure 3:
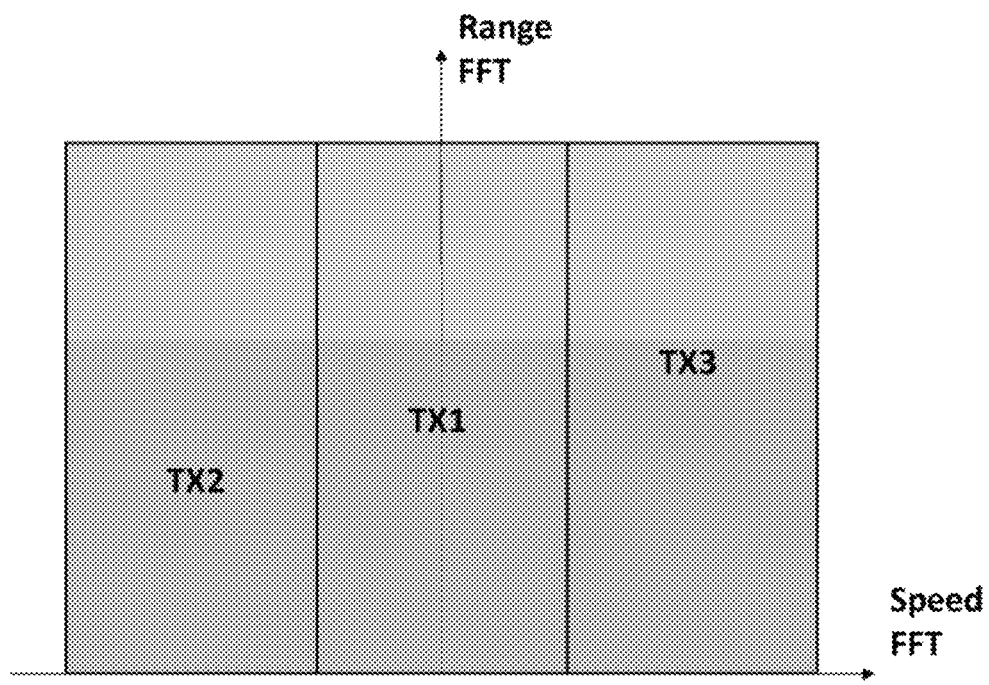
FIG. 3 is a two-dimensional fast Fourier transform (FFT) representation for three transmission channels.

Phase modulation of successive chirps creates an offset in the doppler domain, resulting in the different transmission channels being easy to extract. A representation of a two-dimensional FFT in terms of range versus speed for the three transmission channels TX1, TX2, TX3 is shown in FIG. 3.

Instead of using multiple transmitters, the phase differences between channels and between successive chirps may be generated using a relationship between the electrical length of a feeding structure of each antenna and the centre frequency of each chirp. In this way, with one transmitter connected to multiple antennas it is possible to generate a MIMO radar system.

Figure 4:
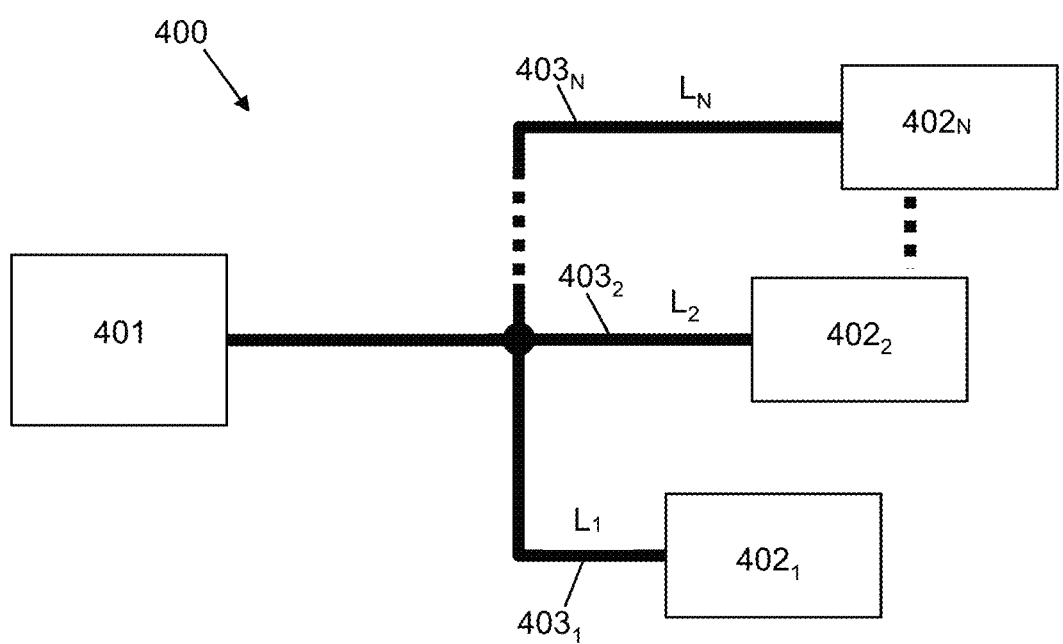
FIG. 4 is a schematic diagram of an example MIMO radar system.

FIG. 4 illustrates an example MIMO radar system 400 with a single transmitter 401 providing signals to a plurality of antennas 402$_{1-N}$ along a corresponding plurality of signal paths 403$_{1-N}$. The electrical length L$_{1-N}$ of each signal path 403$_{1-N}$ is dependent on the required phase difference for signals provided to each antenna 402$_{1-N}$. N is the number of signal paths and the corresponding number of antennas and transmission signals.

Figure 5:
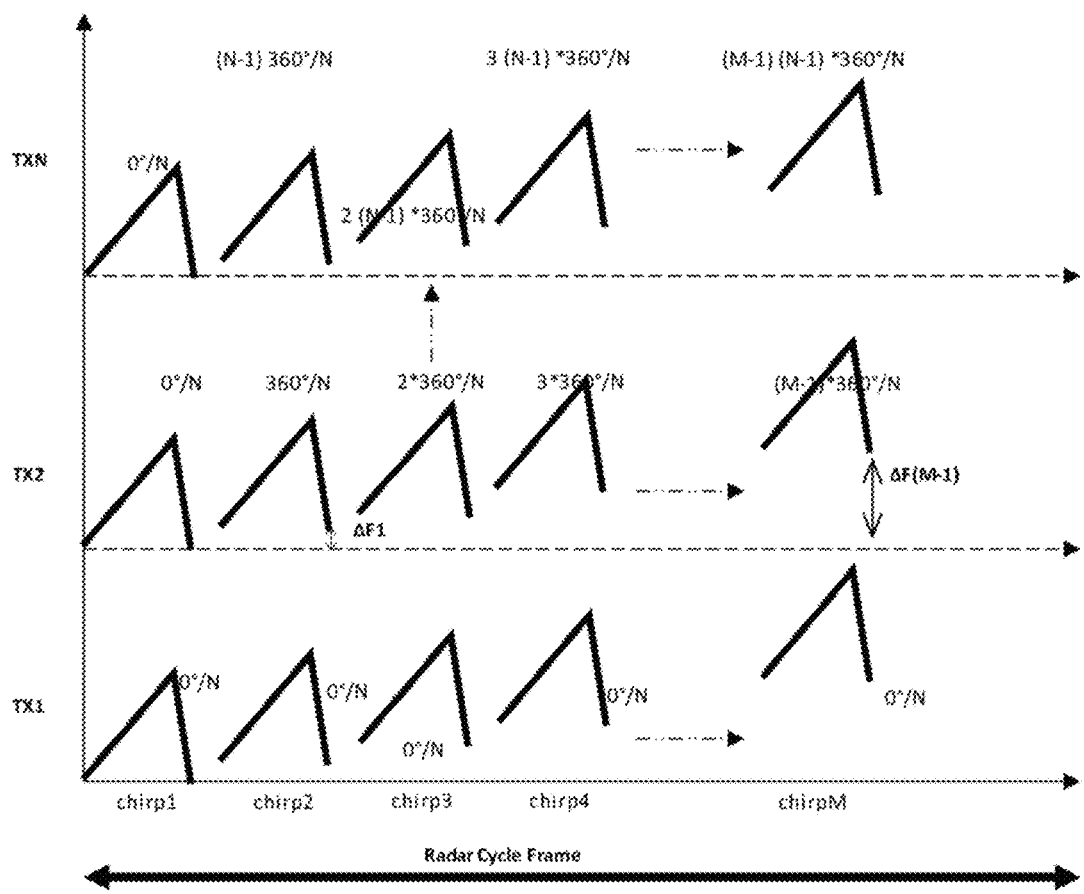
FIG. 5 is a schematic diagram of N transmission signals over N transmission channels, each comprising M chirps.

FIG. 5 schematically illustrates N transmission signals TX1-TXN, each comprising M chirps, chirp1 to chirpM. Successive chirps in each transmission signal are offset in frequency such that chirpM in each transmission signal is offset by $\Delta F(m-1)$, where $\Delta F$ is the offset between successive chirps and m is an integer from 1 to M. Each chirp also has a phase shift of $(m-1)(n-1)*360°/N$, where n is an integer from 1 to N. Table 2 below provides a summary of the relationships between the electrical lengths of antenna feed lines L$_1$ to L$_N$ and chirps 1 to M provided to each of the antennas at centre frequencies F$_1$ to F$_M$. The first antenna feed line 403$_1$ should be provided with a signal having a 0° phase shift, and should therefore have an electrical length L$_1$ that is equal to a multiple of wavelengths of all frequencies used, i.e.:

$$L_1 = A_{11}\lambda_1 = A_{21}\lambda_2 = A_{31}\lambda_3 = A_{M1}\lambda_M$$

where A$_{XY}$ are integer values assigned to provide aligned phases between channels at different frequencies.

The second antenna feed line 403$_2$ should also provide a progressive phase shift for consecutive frequencies, i.e. at $+\lambda_2/N$, $2\lambda_3/N$, $3\lambda_4/N$ and so on, i.e.:

$$L_2 - L_1 = B_1\lambda_1 = B_2\lambda_2 + \frac{\lambda_2}{N} = B_3\lambda_3 + \frac{2\lambda_3}{N} = B_N\lambda_M + (N-1)\lambda_M/N$$

Applying the phase shift boundary conditions for the remaining antenna feed lines provides a complete set of equations that are required for the system design. The design procedure may begin by defining the frequencies to be used with the different chirps followed by finding the integer values that satisfy all of the required relationships.

Figure 6:
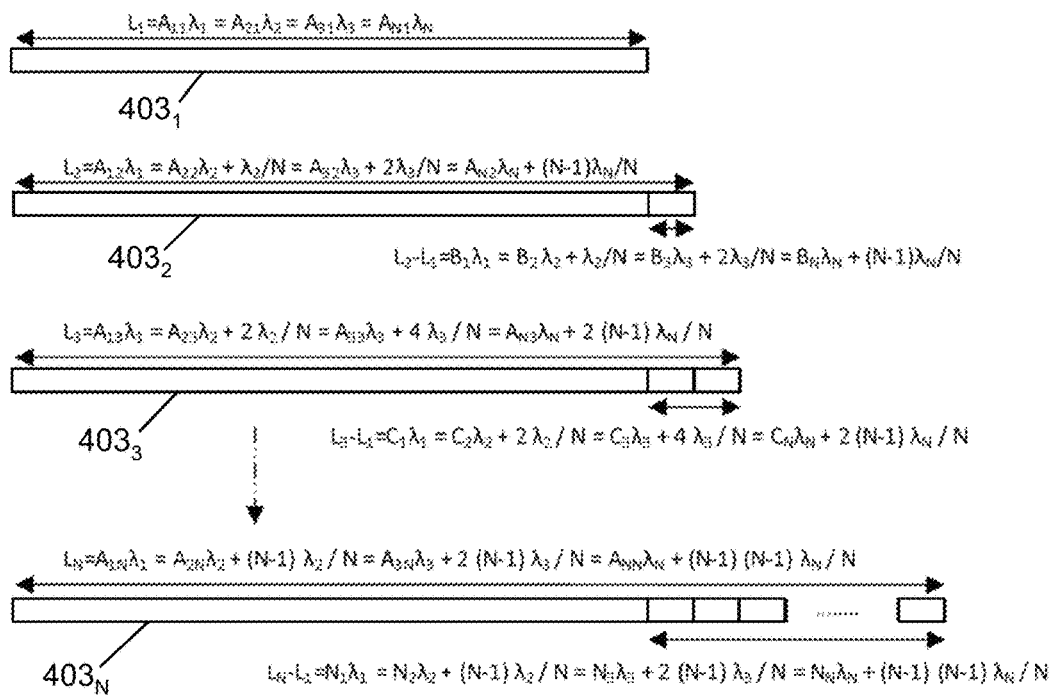
FIG. 6 illustrates different electrical length antenna feed lines.

Table 3 provides a set of relationships indicating the electrical length differences between each antenna feed line in terms of the wavelengths of the chirp centre frequencies. The electrical lengths and differences in Tables 1 and 2 are illustrated graphically in FIG. 6 for antenna feed lines 403$_{1-N}$.

For $L_i$: $\frac{\lambda_2}{\lambda_1} = \frac{f_1}{f_2} = \frac{A_{11}}{A_{21}}$ and $\frac{f_1}{f_3} = \frac{A_{11}}{A_{31}}$ and $\frac{f_1}{f_M} = \frac{A_{11}}{A_{M1}}$ $$B_1\lambda_1 = B_2\lambda_2 + \frac{\lambda_2}{N} \qquad B_1 = \left(B_2 + \frac{1}{N}\right) * \frac{\lambda_2}{\lambda_1}$$

For $L_2 - L_1$: $B_1\lambda_1 = B_3\lambda_3 + \frac{2 \cdot \lambda_3}{N} \qquad B_1 = \left(B_3 + \frac{2}{N}\right) * \frac{\lambda_3}{\lambda_1}$ $$B_1\lambda_1 = B_M\lambda_M + \frac{(M-1) \cdot \lambda_M}{N} \qquad B_1 = \left(B_M + \frac{M-1}{N}\right) * \frac{\lambda_M}{\lambda_1}$$

For $L_N -$ $$N_1\lambda_1 = N_2\lambda_2 + \frac{(N-1) \cdot \lambda_2}{N} \qquad N_1 = \left(N_2 + \frac{N-1}{N}\right) * \frac{\lambda_2}{\lambda_1}$$

$L_1$: $N_1\lambda_1 = N_3\lambda_3 + \frac{2 \cdot (N-1) \cdot \lambda_3}{N} \qquad N_1 = \left(N_3 + \frac{2 \cdot (N-1)}{N}\right) * \frac{\lambda_3}{\lambda_1}$ $$N_1\lambda_1 = N_M\lambda_M + \frac{(M-1) \cdot (N-1) \cdot \lambda_M}{N} \qquad N_1 = \left(N_M + \frac{(M-1) \cdot (N-1)}{N}\right) * \frac{\lambda_M}{\lambda_1}$$

TABLE 2

Calculation of equivalent lengths for N antenna feeds

| Equivalent length vs frequency | Chirp 1: $F_1$ | Chirp 2: $F_2$ | Chirp 3: $F_3$ | Chirp N: ... $F_N$ | Chirp N + 1: $F_{N+1}$ | Chirp M: ... $F_M$ |
|---|---|---|---|---|---|---|
| $L_1$ | $A_{11}\lambda_1$ | $A_{21}\lambda_2$ | $A_{31}\lambda_3$ | ... $A_{N1}\lambda_N$ | $A_{11}\lambda_1$ | ... $A_{M1}\lambda_M$ |
| $L_2$ | $A_{12}\lambda_1$ | $A_{22}\lambda_2 + \lambda_2/N$ | $A_{32}\lambda_3 + 2\lambda_3/N$ | ... $A_{N2}\lambda_N + (N-1)\lambda_N/N$ | $A_{12}\lambda_1$ | ... $A_{M2}\lambda_M + (M-1)\lambda_M/N$ |
| $L_3$ | $A_{13}\lambda_1$ | $A_{23}\lambda_2 + 2\lambda_2/N$ | $A_{33}\lambda_3 + 4\lambda_3/N$ | ... $A_{N3}\lambda_N + 2*(N-1)\lambda_N/N$ | $A_{13}\lambda_1$ | ... $A_{M3}\lambda_M + 2*(M-1)\lambda_M/N$ |
| ... | | | | | | |
| $L_Y$ Chirp X | | X [1 to M] modulo N; Y [1 to N]: $A_{XY}\lambda_X + (Y-1) * (X-1) \lambda_X/N$ | | | | |
| ... | | | | | | |
| $L_N$ | $A_{1N}\lambda_1$ | $A_{2N}\lambda_2 + (N-1)\lambda_2/N$ | $A_{3N}\lambda_3 + 2*(N-1)\lambda_3/N$ | ... $A_{NN}\lambda_N + (N-1)*(N-1)\lambda_N/N$ | $A_{1N}\lambda_1$ | ... $A_{MN}\lambda_M + (N-1)*(M-1)\lambda_M/N$ |

TABLE 3

Calculation of equivalent length differences for N antenna feeds

| Equivalent length vs frequency | Chirp 1: $F_1$ | Chirp 2: $F_2$ | Chirp 3: $F_3$ | Chirp N: ... $F_N$ | Chirp N + 1: $F_{N+1}$ | Chirp M = P*N: $F_M$ Where P ... is an integer |
|---|---|---|---|---|---|---|
| $L_1$ | $A_{11}\lambda_1$ | $A_{21}\lambda_2$ | $A_{31}\lambda_3$ | ... $A_{N1}\lambda_N$ | $A_{11}\lambda_1$ | ... $A_{N1}\lambda_N$ |
| $L_2 - L_1$ | $B_1 \lambda_1$ | $B_2 \lambda_2 + \lambda_2/N$ | $B_3 \lambda_3 + 2\lambda_3/N$ | ... $B_N \lambda_N + (N-1)\lambda_N/N$ | $B_1 \lambda_1$ | ... $B_N \lambda_N + (N-1)\lambda_N/N$ |
| $L_3 - L_1$ | $C_1 \lambda_1$ | $C_2 \lambda_2 + 2\lambda_2/N$ | $C_3 \lambda_3 + 4\lambda_3/N$ | ... $C_N \lambda_N + 2*(N-1)\lambda_N/N$ | $C_1 \lambda_1$ | ... $C_N \lambda_N + 2*(N-1)\lambda_N/N$ |
| ... | ... | ... | ... | ... ... | ... | ... ... |
| $L_N - L_1$ | $N_1 \lambda_1$ | $N_2 \lambda_2 + (N-1)\lambda_2/N$ | $N_3 \lambda_3 + 2*(N-1)\lambda_3/N$ | ... $N_N \lambda_N + (N-1)*(N-1)\lambda_N/N$ | $N_1 \lambda_1$ | ... $N_N \lambda_N + (N-1)*(N-1)\lambda_N/N$ |

Figure 7:
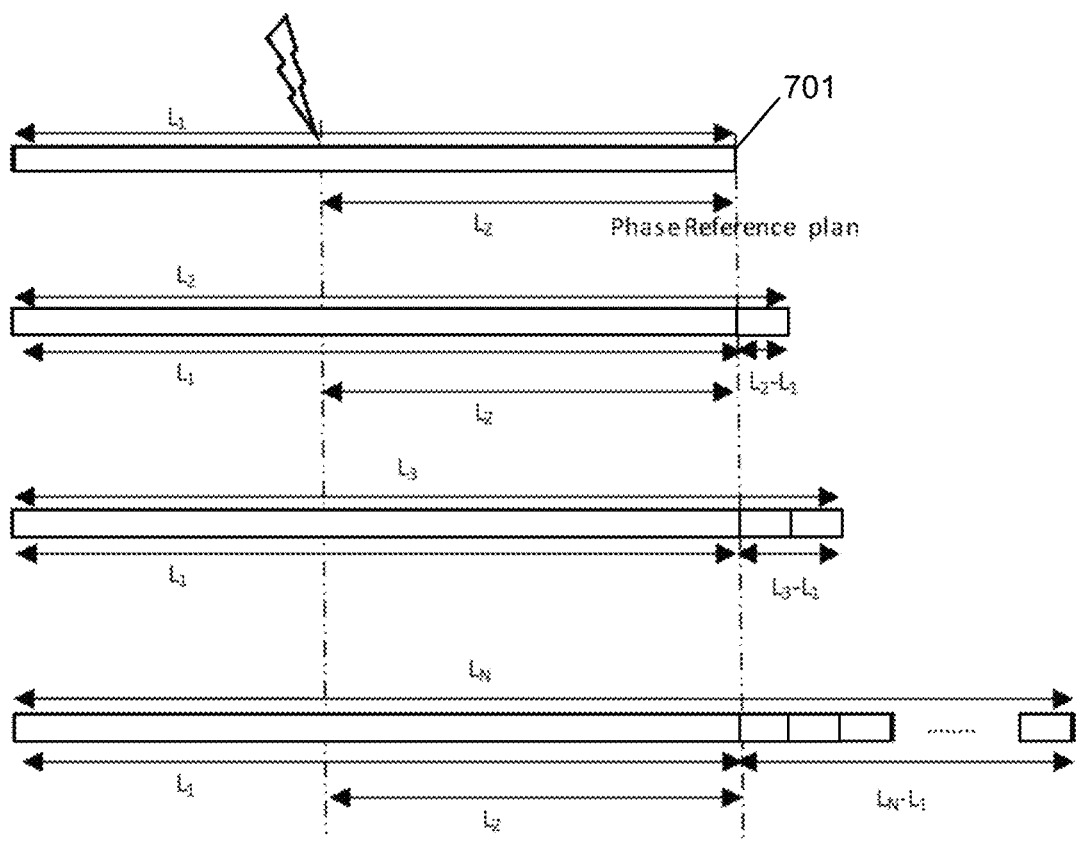
FIG. 7 further illustrates different antenna feed lines.

A practical design environment may not allow for sufficient flexibility to choose each antenna feed electrical length. Therefore, to simplify design the electrical length $L_1$ may be replaced with any electrical length. This creates a mismatch in phase in a reference plan 701 at the end of $L_1$ between chirps due the frequency shift introduced, i.e. the point in the waveguide used to define the phase within and between the channels. The phase reference plan at the end of $L_1$ can be adjusted by using the TX phase rotator. FIG. 7 illustrates schematically a series of antenna feeds 703$_{1-N}$ of electrical lengths $L_{1-N}$.

The phase extractions at the reference plan 701 are indicated in Tables 4, 5 and 6 below. Table 4 indicates the phase in the reference plan using $L_1$. Table 5 indicates the phase in the reference plan for an arbitrary electrical length $L_Z$. Table 6 indicates the phase in the reference plan for $L_Z$ with opposite phase rotation, i.e. $-E°$ for F1, $-F°$ for F2 and $-G°$ for F3.

TABLE 5

Phase extraction at the reference plan for antenna feed length $L_1$.

| | Phase in the reference plan using $L_1$ | | |
|---|---|---|---|
| | Chirp1: $F_1$ | Chirp2: $F_2$ | Chirp3: $F_3$ |
| $L_1$ | 0° | 0° | 0° |
| $L_2$ | 0° | 0° | 0° |
| $L_3$ | 0° | 0° | 0° |

TABLE 6

Phase extraction at the reference plan for an arbitrary length $L_Z$.

| | Phase in the reference plan using $L_Z$ | | |
|---|---|---|---|
| | Chirp1: $F_1$ | Chirp2: $F_2$ | Chirp3: $F_3$ |
| $L_Z$ | E° | F° | G° |
| $L_Z + L_2 - L_1$ | E° | F° | G° |
| $L_Z + L_3 - L_1$ | E° | F° | G° |

TABLE 7

Phase extraction at the reference plan for an arbitrary length $L_Z$ with opposite phase rotator correction.

| | Phase in the reference plan using $L_Z$ | | |
|---|---|---|---|
| | Chirp1: $F_1$ | Chirp2: $F_2$ | Chirp3: $F_3$ |
| $L_Z$ | 0° | 0° | 0° |
| $L_Z + L_2 - L_1$ | 0° | 0° | 0° |
| $L_Z + L_3 - L_1$ | 0° | 0° | 0° |

To take an example embodiment where N=2, i.e. a single transmitter is driving only two antennas, the first step is to define the frequency difference ΔF between successive chirps. In this example, ΔF is defined as 5%. This may then be input into the equations mentioned above and the resulting calculations are:

$$f_2 = 1.05 f_1$$

$$B_1 = \left(B_2 + \frac{1}{2}\right) * \frac{\lambda_2}{\lambda_1}$$

$$B_1 = \left(B_2 + \frac{1}{2}\right) * \frac{100}{105}$$

with the result that:

$$B_1 = \frac{200B_2 + 100}{210}$$

This equation has multiple solutions as there are two unknowns and only one relationship between $B_1$ and $B_2$. Given that $B_1$ and $B_2$ are integers, the smallest solution, which limits the design constraints, is $B_1=10$ and $B_2=10$, which results in:

$$L_1 = 100\lambda_1 = 105\lambda_2$$

$$L_2 = 110\lambda_1 = 115\lambda_2 + \frac{\lambda_2}{N}$$

This provides some critical constraint to the hardware design. The simplification concept as described above may be applied to reduce significantly the different electrical lengths $L_1$ and $L_2$ except the delta L which is fixed and required for the concept.

$$L_Z = 10\ \lambda_1 = 10.5\ \lambda_2$$

For this we have to determine the new phase for both frequencies $f_1$ and $f_2$.

For $f_1$ $L_1 - L_Z = 100\ \lambda_1 - 10\ \lambda_1 = 90\ \lambda_1$

This is an integer number of lambdas, so the reference phase is still 0°

For $f_2$ $L_1 - L_Z = 105\ \lambda_2 - 10.5\ \lambda_2 = 94.5\ \lambda_2$

This is an integer number of lambdas plus half one, so the reference phase is 180°

Between both frequencies $f_1$ and $f_2$ the TX phase has to be shifted by 180° to keep the phase coherency of the system.

Figure 8:
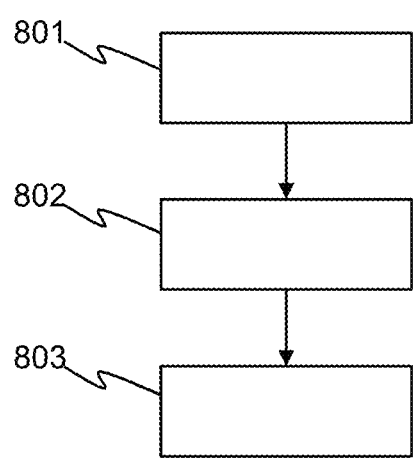
FIG. 8 is a flow diagram illustrating an example method of designing a DDM MIMO radar system.

FIG. 8 is a flow chart illustrating an example method of designing a DDM MIMO radar system 400 of FIG. 4, the system 400 having N antennas 402$_{1-N}$ connected to a transmitter 401 via N signal paths 403$_{1-N}$ having electrical lengths $L_{1-N}$. In a first step 801 a series of M frequencies separated by a frequency difference ΔF and having wavelengths $\lambda_{1-M}$ are defined. These frequencies define the centre frequencies of the series of chirps to be transmitted in each radar cycle frame. In a second step 802, an electrical length $L_1$ of a first one 403$_1$ of the N signal paths 403$_{1-N}$ is determined. The electrical length $L_1$ may be determined arbitrarily or may be determined as $A_{m1}\lambda_m$, where $A_{m1}$ is an integer and $\lambda_m$ is a wavelength of an $m^{th}$ one of the series of M frequencies. In a third step 803, a difference in electrical length between the first one 403$_1$ of the N signal paths 403$_{1-N}$ and an $n^{th}$ signal path as $X_n\lambda_m + (m-1)(n-1)\lambda_n/N$, where $X_n$ is an integer, is determined. The electrical lengths of each of the signal paths between the transmitter and the N antennas are thereby defined such that a phase of a signal transmitted by the transmitter 401 is different at each of the plurality of transmitter antennas 402$_{1-N}$.

From reading the present disclosure, other variations and modifications will be apparent to the skilled person. Such variations and modifications may involve equivalent and other features which are already known in the art of memory systems, and which may be used instead of, or in addition to, features already described herein.

Although the appended claims are directed to particular combinations of features, it should be understood that the scope of the disclosure of the present invention also includes any novel feature or any novel combination of features disclosed herein either explicitly or implicitly or any generalisation thereof, whether or not it relates to the same invention as presently claimed in any claim and whether or not it mitigates any or all of the same technical problems as does the present invention.

Features which are described in the context of separate embodiments may also be provided in combination in a single embodiment. Conversely, various features which are, for brevity, described in the context of a single embodiment, may also be provided separately or in any suitable subcombination. The applicant hereby gives notice that new claims may be formulated to such features and/or combinations of such features during the prosecution of the present application or of any further application derived therefrom.

For the sake of completeness it is also stated that the term "comprising" does not exclude other elements or steps, the term "a" or "an" does not exclude a plurality, a single processor or other unit may fulfil the functions of several means recited in the claims and reference signs in the claims shall not be construed as limiting the scope of the claims.

The invention claimed is:

1. A doppler division multiplexing (DDM) multiple input multiple output (MIMO) radar system comprising a transmitter connected to an antenna assembly having a set of N antennas via a corresponding set of N signal paths of different electrical lengths, where N is an integer greater than one;
   wherein the transmitter is configured to generate a series of M chirps in a radar cycle frame and to provide each chirp to each antenna of the antenna assembly, where M is an integer greater than one;
   wherein each chirp in the series of M chirps has a corresponding center frequency, the corresponding center frequency changing between successive chirps;
   wherein the corresponding center frequency of the first chirp in the series of M chirps in the radar cycle frame is a first center frequency that corresponds to a first wavelength ($\lambda_1$);
   wherein the antenna assembly is dimensioned such that, at the first center frequency, the electrical lengths of the set of N signal paths differ from each other by integer multiples of the first wavelength; and
   wherein the antenna assembly is further dimensioned such that, when the radar system transmits each chirp of the series of M chirps in the radar cycle frame, a corresponding pattern of phase differences between each of the antennas at the center frequency of that chirp is different from corresponding patterns of phase differences between each of the antennas arms for each other chirp of the series of M chirps.

2. The radar system of claim 1, wherein the antenna assembly is dimensioned such that each of the N signal paths has an electrical length $L_{m,n}$, for integer values n between 1 and N inclusive of N and for integer values m between 1 and M inclusive of M, such that a phase difference between an $m^{th}$ chirp in the radar cycle frame at an $n^{th}$ antenna and the $m^{th}$ chirp at a first antenna is equal to $(m-1)(n-1)*360°/NV$ at the corresponding center frequency for that chirp.

3. The radar system of claim 1, wherein the antenna assembly is dimensioned such that, for each chirp of the set of M chirps, for integer values m between 1 and M inclusive of M, the electrical length at the corresponding center frequency for that chirp ("$L_{m,1}$") of the signal path corresponding to the first antenna is a corresponding integer multiple of the center frequency for that chirp.

4. The radar system of claim 3,
   wherein the antenna assembly is dimensioned such that, for each chirp of the set of M chirps, the electrical length at the corresponding center frequency for that chirp ($L_{m,1}$) of the signal path corresponding to the first antenna is greater than a corresponding integer multiple of the center frequency for that chirp; and
   wherein the radar system is further configured to adjust the phase of each chirp before delivering that chirp to the antenna assembly such that the phase of each chirp as transmitted by the first antenna is constant at the center frequency of that chirp.

5. The radar system of claim 1, wherein the radar system is further configured to adjust the phase of each chirp before delivering that chirp to the antenna assembly such that the phase of each chirp as transmitted by the first antenna is constant at the center frequency of that chirp.

6. A method of operating a doppler division multiplexing (DDM) multiple input multiple output (MIMO) radar system comprising a transmitter connected to an antenna assembly having a set of N antennas via a corresponding set of N signal paths of different electrical lengths, where N is an integer greater than 1, the method comprising the transmitter generating a series of M chirps in a radar cycle frame provided to each antenna, where M is an integer greater than 1;
   wherein each chirp in the series of M chirps has a corresponding center frequency, the corresponding center frequency changing between successive chirps;
   wherein the corresponding center frequency of the first chirp in the series of M chirps in the radar cycle frame is a first center frequency that corresponds to a first wavelength ($\lambda_1$);
   wherein the antenna assembly is dimensioned such that, at the first center frequency, the electrical lengths of the set of N signal paths differ from each other by integer multiples of the first wavelength; and
   wherein the antenna assembly is further dimensioned such that, when the radar system transmits each chirp of the series of M chirps in the radar cycle frame, a corresponding pattern of phase differences between each of the antennas at the center frequency of that chirp that is different from the corresponding pattern of phase differences of each other chirp of the series of M chirps.

7. The method of claim 6, wherein the antenna assembly is further dimensioned such that, for integer values of n between 1 and N inclusive of N and for integer values of m between 1 and M inclusive of M, each of the N signal paths has an electrical length $L_{m,n}$ such that a phase difference between an $m^{th}$ chirp in the radar cycle frame at an $n^{th}$ antenna and the $m^{th}$ chirp at a first antenna is equal to $(m-1)(n-1)*360°/N$ at the corresponding center frequency for that chirp.

8. The method of claim 6, wherein the antenna assembly is further dimensioned such that, for each chirp of the set of M chirps, for integer values m between 1 and M inclusive of M, the electrical length at the corresponding center frequency for that chirp ("$L_{m,1}$") of the signal path corresponding to the first antenna is a corresponding integer multiple of the center frequency for that chirp.

9. The radar system of claim 8, wherein the antenna assembly is dimensioned such that, for each chirp of the set of M chirps, the electrical length at the corresponding center frequency for that chirp ("$L_{m,1}$") the signal path corresponding to the first antenna is greater than a corresponding integer multiple of the center frequency for that chirp; and wherein the radar system is further configured to adjust the phase of each chirp before delivering that chirp to the antenna assembly such that the phase of each chirp as transmitted by the first antenna is constant at the center frequency of that chirp.

10. The radar system of claim 6, wherein the radar system is further configured to adjust the phase of each chirp such that a relative phase of each chirp as transmitted by the first antenna is constant at the center frequency of that chirp.

* * * * *